United States Patent [19]

Shimano

[11] Patent Number: 4,462,267
[45] Date of Patent: Jul. 31, 1984

[54] HANDLEBAR FOR A BICYCLE

[75] Inventor: Keizo Shimano, Sakai, Japan

[73] Assignee: Shimano Industrial Company, Limited, Osaka, Japan

[21] Appl. No.: 235,568

[22] Filed: Feb. 18, 1981

[30] Foreign Application Priority Data

Mar. 1, 1980 [JP] Japan .................. 55-26759
Mar. 1, 1980 [JP] Japan .................. 55-26760

[51] Int. Cl.³ ............................. B62K 21/12
[52] U.S. Cl. ...................... 74/489; 74/551.1
[58] Field of Search ............... 74/487, 489, 551.1, 74/551.8; D12/178

[56] References Cited

U.S. PATENT DOCUMENTS

| 576,573 | 2/1897 | Gould | 74/551.1 |
| 2,583,609 | 1/1952 | Souhart | 74/489 |
| 3,905,242 | 9/1975 | Hoffman . | |
| 4,245,522 | 1/1981 | Robinson . | |

FOREIGN PATENT DOCUMENTS

| 2930206 | 2/1981 | Fed. Rep. of Germany . | |
| 2931826 | 2/1981 | Fed. Rep. of Germany . | |
| 884159 | 4/1943 | France | 74/489 |
| 1016016 | 10/1952 | France . | |
| 1038667 | 9/1953 | France | 74/489 |
| 1086626 | 2/1955 | France . | |
| 306743 | 3/1933 | Italy | 74/489 |
| 16714 | 8/1905 | United Kingdom | 74/489 |

Primary Examiner—Kenneth Dorner
Attorney, Agent, or Firm—Stevens, Davis, Miller & Mosher

[57] ABSTRACT

A handlebar for a bicycle, which comprises a bar body having a mounting portion for a handle stem of the bicycle and gripping members each having a gripping portion, the bar body and gripping members being separate from each other, the gripping members being provided with support brackets for supporting control levers respectively.

5 Claims, 4 Drawing Figures

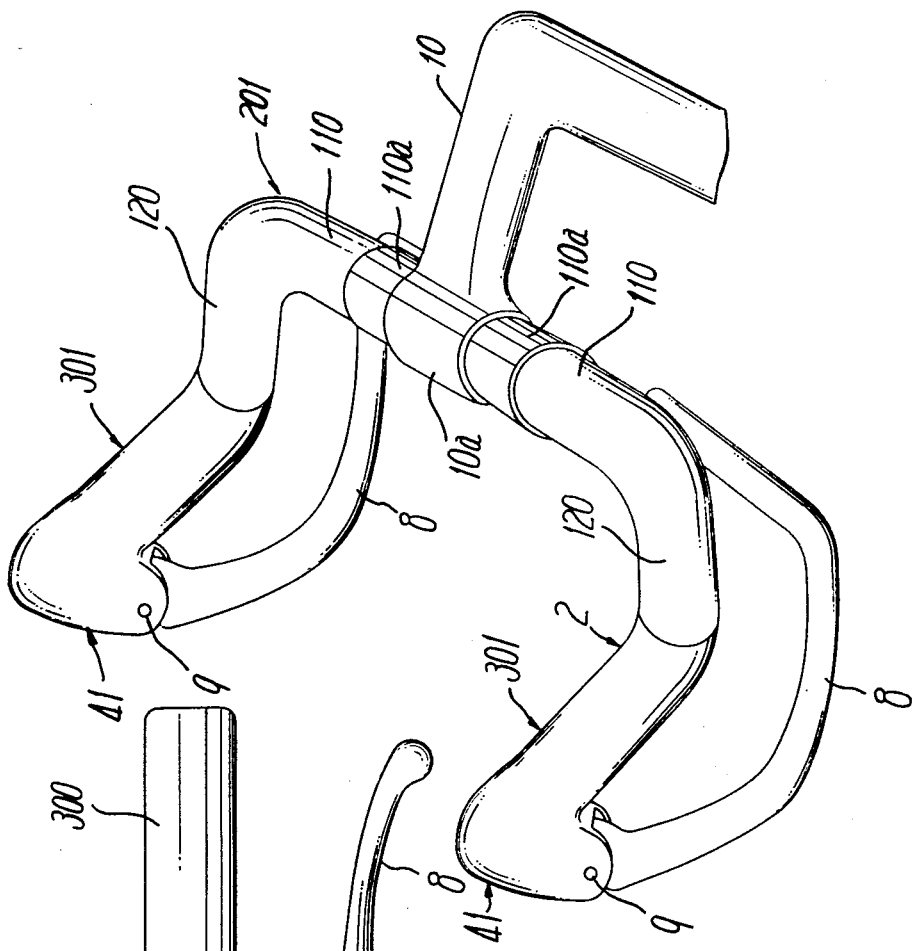

HANDLEBAR FOR A BICYCLE

FIELD OF THE INVENTION

This invention relates to a handlebar for a bicycle, which is mounted on a handle stem thereof, and more particularly to a handlebar comprising a bar body having a mounting portion for mounting the handlebar to the handle stem and gripping members each having a gripping portion.

BACKGROUND OF THE INVENTION

Generally, a handlebar for a bicycle is made from a metallic pipe and integrally comprises a bar body and gripping portions carrying braking control levers or the like through bracket members, the bracket members being separate from the gripping portions and fixed thereto by use of bands.

The gripping portions are bent with respect to the straight bar body so that a driver may easily grip them. Hence, it is difficult, especially for a drop type handlebar, to insert the bar body through a cylindrical handle lug at the handle stem because the bar body is integral with the bent gripping portions.

Also, in order to attach braking control levers to the handlebar, bracket members separate therefrom must be mounted on the handlebar usually by use of bands. This mounting work takes much time and the bands exposed to the exterior are affected by air resistance and have a poor appearance.

Furthermore, the gripping portions integral with the bar body are almost formed of a pipe, which makes it hard to form each gripping portion only into a shape which easily fits a driver's hands. Therefore, the gripping portions are usually covered with separate grips.

The gripping portions of the handlebar, especially of a drop type handlebar, preferably have a changed form corresponding to the kind of bicycle or a driver's physique, but the conventional handlebar integrally made from a metallic pipe is limited in form and is not freely changeable.

Also, the handlebar of a flat, up or drop type, usually has a length which is not changeable.

SUMMARY OF THE INVENTION

An object of the invention is to provide a bicycle handlebar which can: easily be mounted on a handle lug at a handle stem, easily furnish braking control levers, desirably change a form of a gripping portion regardless of the form of the bar body, and adjust the length of the handlebar.

This invention is characterized in that the bar body and gripping portions are formed independently of each other and fixedly connected by fixing means, and bracket members for supporting the control levers are integral with the gripping portions respectively.

This invention is applicable to a flat, up and drop type handlebars, and is more advantageous especially when applied to the latter.

A driver, when steering the bicycle by manipulating the drop type handlebar, at times grips: first straight portions extending substantially horizontally from a mounting portion through which the handlebar is mounted to the handle stem, the upper portions of second bent portions which extend forwardly and curve downwardly and rearwardly from first bent portions curving forwardly from the ends of the first straight portions; and second straight portions extending rearwardly from the lower rear ends of second bent portions.

A drop type handlebar of the invention is divided between the second bent portions and the first bent portions, so that U-like shape portions including the second bent portions and second straight portions, are called the gripping members in this invention. The gripping members serve as the main point of the drop type handlebar, because the aforesaid second bent portions and second straight portions are provided to enable the driver to grip the handlebar changing his posture while driving the bicycle.

The handlebar of the invention, which is divided into the bar body and gripping members and connects them by a fixing means, can meet a driver's desire or physique, or the kind or purpose of use of the bicycle, in such a manner that a plurality of gripping members of different shape may be selectively mounted on the bar body already fixed to the handle stem in an assembly of the bicycle.

The bar body separate from the gripping members is mounted on the handle stem prior to a fixing of the gripping members to the bar body, thereby facilitating its insertion through the handle lug regardless of the form or size of the gripping member.

Also, since the bar body and gripping members are separate from each other, they need no space for storage or transport.

Furthermore, each gripping member separate from the bar body can be formed in a shape which provices reduced air resistance, have a section which easy fits the driver's hands, and desirably changes the whole length of the handlebar. The bracket member integral with the gripping member can easily mount thereon a braking control lever or the like without the use of a band exposed to the exterior, so that the handlebar can reduce air resistance, has a good appearance, and eliminates a defect of accidentally shifting the control lever due to a loosening of the band.

These and other objects of the invention will become more apparent from the detailed description and examples which follow:

BRIEF DESCRIPTION OF THE DRAWINGS

FIG. 3 is a view of a part of an embodiment of a flat type handlebar of the invention, and FIG. 4 is a perspective view of an embodiment of an up type handlebar of the invention.

DETAILED DESCRIPTION OF THE INVENTION

Figure 1:
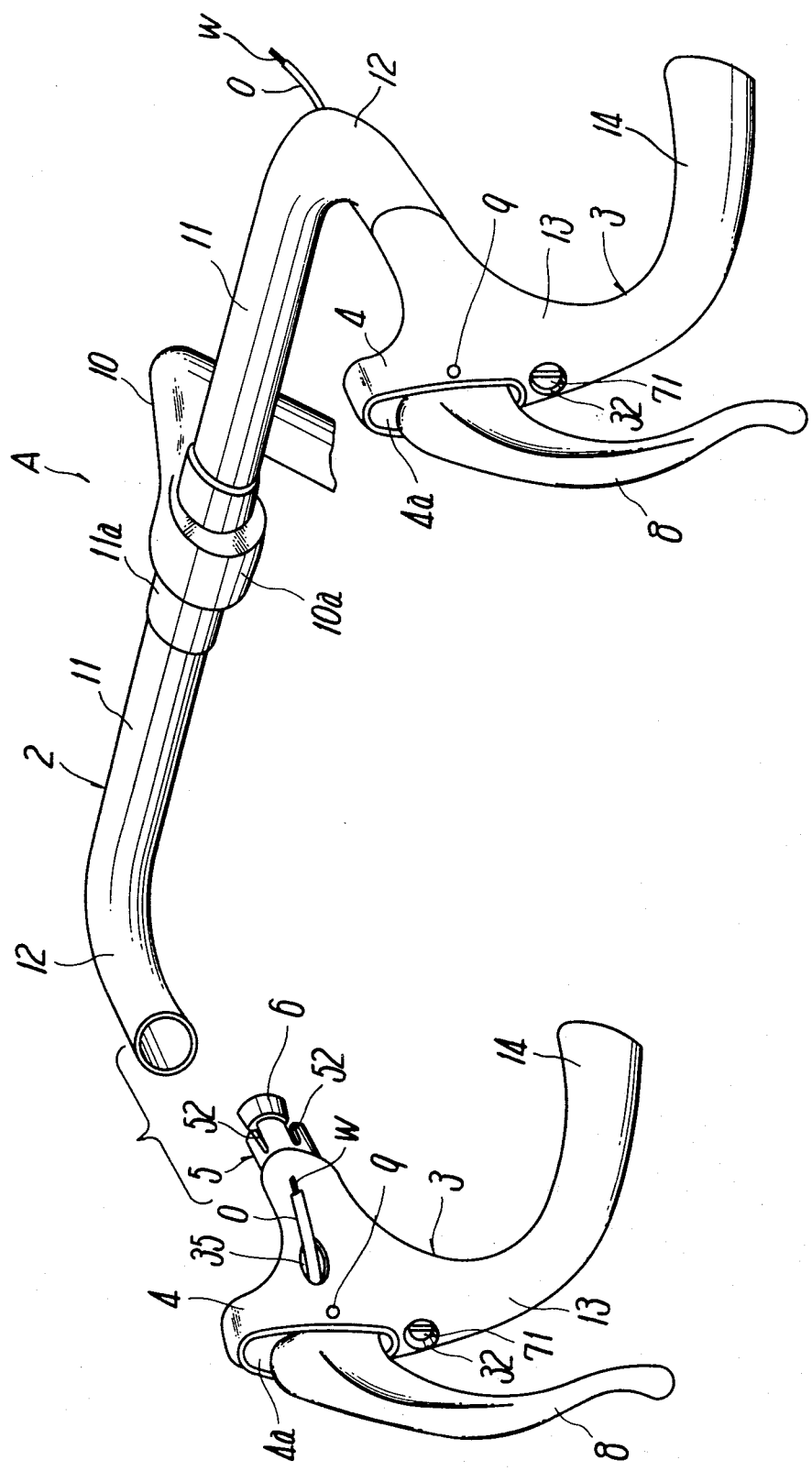
FIG. 1 is a perspective view of an embodiment of a drop type handlebar of the invention.

Referring to FIG. 1, reference A generally designates a drop type handlebar equipped mainly for a sport type bicycle. The drop-type handlebar A comprises first straight portions 11 each having at one end a mounting portion 11a through which the handlebar is mounted on a handle stem 10 at the bicycle and extending horizontally from the mounting portion, first bent portions 12 each extending in a curve forwardly of the bicycle from a lengthwise outer end of each straight portion 11, second bent portions 13 each extending in a curve downwardly and rearwardly from the front end of each first bent portion 12, and second straight portions 14 extending rearwardly from the lower rear ends of second bent portions 13 respectively. A driver steers the bicycle by gripping the first straight portions 11 while driving it at low speed, the second bent portions 13 at middle speed, and the second straight portions 14 at high speed.

The drop type handlebar A has a pair of gripping members 3 which are formed of second bent portions 13 and second straight portions 14. The gripping members 13 are separate from a bar body 2 which integrally comprises the first straight portions 11 and first bent portions 12, the gripping members 3 being integral with brackets 4 carrying braking control levers 8 or the like.

The bar body 2 is formed of a steel or light alloy pipe. The gripping members 3 are formed by a cast or aluminum die cast method, and each have a fixing means for fixing the gripping member 3 to the bar body 2 as shown in FIG. 1.

Figure 2:
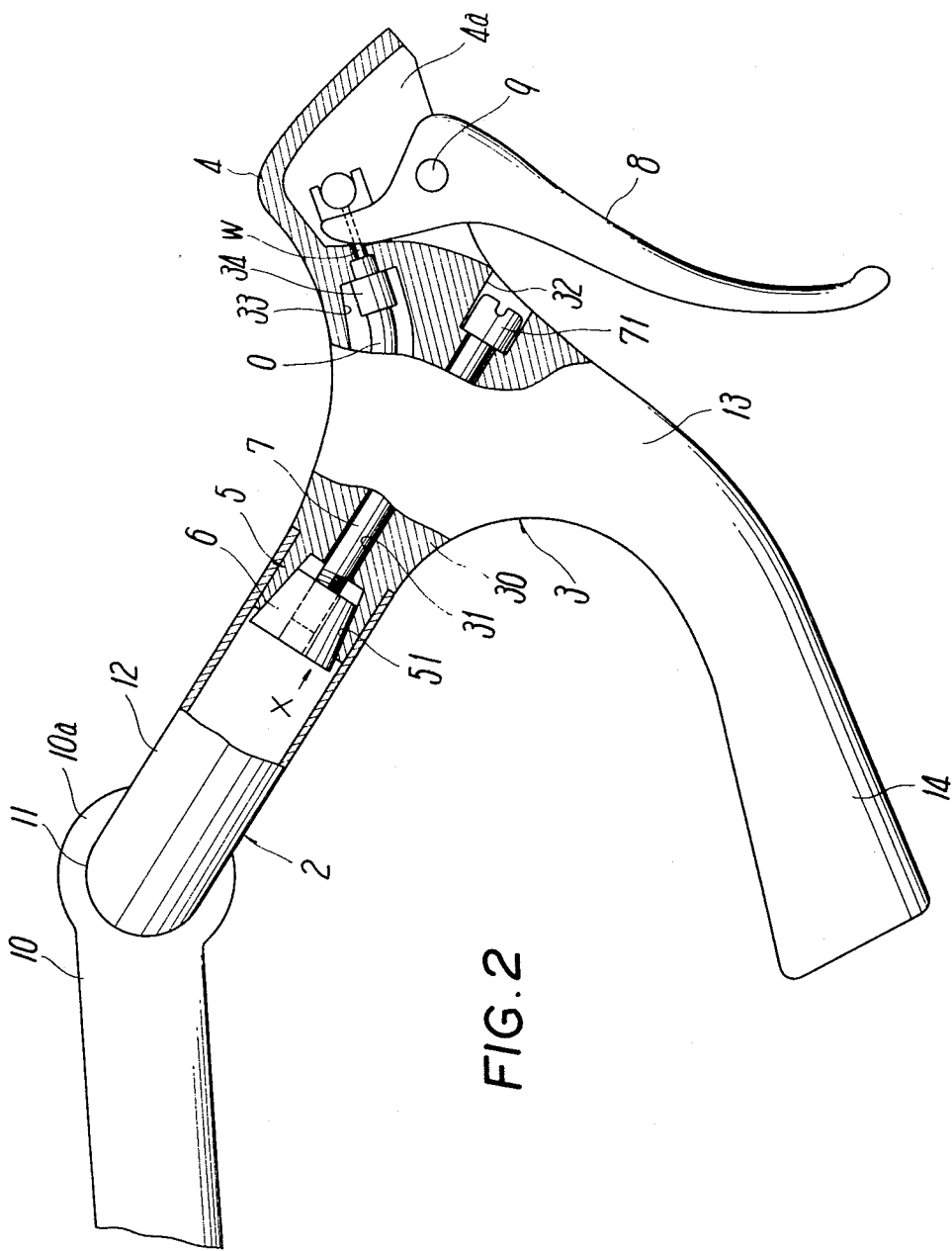
FIG. 2 is a partially cutaway side view of a principal portion of the FIG. 1 embodiment.

The fixing means, as shown in FIG. 2, is so constructed that; each gripping member 3 is provided at one end to be fixed to the bar body 2 with a tubular clamp 5 which has a frustoconical inner periphery 51 and a plurality of cutouts 52 thereat and projects from the gripping member 3 to be fitted at the outer periphery into each end of bar body 2; at each gripping member 3 are provided a conical actuator 6 which engages with the inner periphery 51 of clamp 5 to allow the clamp 5 to radially expand and press-contact with the inner periphery of bar body 2, and a screw member 7 for moving the actuator 6 lengthwise of clamp 5; and the head 71 of the screw member 7 engages with the gripping member 3.

Each gripping member 3 shown in FIG. 2 is made partially solid, and is provided at the solid portion 30 with an insertion bore 31 for the screw member 7 and at the outer surface with a recess 32 for receiving therein the screw member 7.

The fixing means constructed as foregoing, fixes each gripping member 3 to the bar body 2 in such a manner that the clamp 5 is fitted into the end of bar body 2 and the screw member 7 is rotated by a screwdriver or the like, so that the actuator 6 screwably moves in the direction of the arrow X in FIG. 2 to radially expand the clamp 5 and press-contact it with the inner periphery of the end of bar body 2. As a result, the gripping members 3 are fixed to the bar body 2 through clamps 5 respectively.

The respective brackets 4 are provided at the front end of second bent portions 13 and rise upwardly therefrom and are hollow to form a cavity 4a into which a braking control lever 8 is pivoted through a pivot pin 9.

The solid portion 30, as shown in FIG. 2, is provided with an insertion bore 33 for a control wire W fixed at its one end to the lever 8 and an outer sheath O guiding the wire W, and with a stop 34 for outer sheath O, the insertion bore 33, as shown in FIG. 1, being open 35 at the side of each gripping member 3, so that the wire W and outer sheath O are drawn out through the opening 35.

The bar body 2 is fixed to a handle lug 10a at the handle stem 10 prior to a fixing of gripping members 3 to the bar body 2, thus facilitating insertion of bar body 2 through the handle lug 10a.

The drop type handlebar of the invention has the brackets 4 rising from the front ends of second bent portions 13, so that a driver, when driving the bicycle gripping the front portions of second bent portions 13, can operate the handlebar in a stable condition because the brackets 4 serve as stoppers for his hands, and also well fit his palms to the bent portions 13 thanks to the brackets 4, thereby becoming less fatigued even when driving the bicycle for a long time.

The handlebar of the invention may alternatively be applicable to a flat type or up type handlebar.

The flat type handlebar, as well-known, comprises a straight bar body extending substantially horizontally from a mounting portion for the handle stem 10, and gripping portions formed in continuation of the bar body and extending outwardly therefrom, being kept in the same level with the mounting portion.

When this invention is applied to the flat type handlebar (FIG. 3), a bar body 200 is separate from gripping members 300. The bar body 200 comprises a mounting portion and straight portions extending substantially horizontally therefrom. The gripping members 300 are made straight in the same direction as the straight portions, comprise bent portions rearwardly curving and straight portions rearwardly extending, or curve upwardly to form straight portions extending in the same direction as the straight portions at the bar body 200 as shown in FIG. 3. Brackets 40 integral with gripping members 300 project downwardly as shown in FIG. 3.

In addition, a fixing means through which the gripping members 300 are fixed to the bar body 200, is constructed the same as in the drop type handlebar. Each part of the fixing means shown in FIG. 3 is designated by the same reference numeral as in FIGS. 1 and 2.

The up type handlebar also is well-known. For example, a bar body 201, as shown in FIG. 4, comprises a mounting portion 110a, straight portions 110 extending substantially horizontally from the mounting portion 110a, and bent portions 120 extending from the ends of straight portions 110. Gripping members 301 are formed to be straight or upwardly curved so as to be directed at the utmost ends upwardly with respect to the straight portions 110. The brackets 41, as shown in FIG. 4, are integral with the utmost ends of gripping members 301 and project downwardly therefrom. In addition, a fixing means for the up type handlebar is constructed similarly to that for the drop type handlebar, which is omitted from FIG. 4.

As seen from the above, the handlebar of the invention, when applied to the drop, flat, or up type handlebar, has gripping members 3, 300 and 301, separate from bar bodies 2, 200 and 201 respectively. Hence, it is easy to form the respective gripping members 3, 300 and 301, to fit the driver's palms regardless of bar bodies 2, 200 and 201, or to arrange several kinds of gripping members corresponding to the driver's physique or the purpose of use of the bicycle, so that a handlebar suitable for the driver to steer is simply produced by selective use of gripping members 3, 300 and 301.

Furthermore, the bar bodies 2, 200 and 201 separate from the gripping members 3, 300 and 301, are easily mounted on the handle stem, the brackets 4, 40 and 41 integral with the gripping members 3, 300 and 301 respectively, are easily assembled to braking control levers or the like, and the elimination of the mounting bands can overcome the problem created by exposure of the band to the exterior.

While preferred embodiments of the invention have been described using specific terms, such description is for illustrative purpose only, and it is to be understood that changes and variations may be made without departing from the spirit or scope of the invention which is defined in the following claims.

What is claimed is:

1. A handlebar for a bicycle, comprising a bar body having a mounting portion through which said handlebar is mounted on a handle stem, a pair of gripping members which have a length permitting them to be graspable by a cyclist's hands and which are positioned at both lengthwise sides of said bar body, said bar body and each of said gripping members being separate from each other, each of said gripping members having an integral support bracket for supporting a control lever, a control lever supported to each of said brackets in a position where it opposes a respective gripping member and a fixing means provided between said bar body and each of said gripping members for fixing each of said gripping members to said bar body, said bar body further comprising straight portions extending substantially horizontally from said mounting portion and first bent portions curving forwardly from ends of said straight portions respectively, each of said gripping members being formed in a substantially U-like shape and comprising a second bent portion and a second straight portion, said second bent portion being provided with an upper end opposite to said first bent portion, extending forwardly from said upper end, and curving downwardly and rearwardly, said second straight portion extending rearwardly from a lower rear end of said second bent portion, so that said bar body and each of said gripping members fixed thereto, form a drop type handlebar.

2. A handlebar for a bicycle according to claim 1, wherein said brackets integrally provided at said gripping members project upwardly from the front portions of said second bent portions at said gripping members respectively.

3. A handlebar for a bicycle according to claim 1, wherein a control lever is pivotally supported to said support bracket at each of said gripping members.

4. A handlebar for a bicycle according to claim 1, wherein said gripping members have said fixing means respectively.

5. A handlebar for a bicycle according to claim 4, wherein each of said gripping members is provided at its end to be fixed to said bar body with a cylindrical clamp, and said bar body is formed of a pipe, so that said clamp is adapted to be fitted into one end of said bar body, said gripping members each having a frustoconical actuator which expands said clamp in diameter and press-contacts with the inner periphery of said bar body and a screw member for moving said actuator lengthwise of said clamp.

* * * * *